United States Patent [19]
Probst et al.

[11] Patent Number: 5,639,817
[45] Date of Patent: Jun. 17, 1997

[54] CARBON BLACK/RUBBER COMPOSITION

[75] Inventors: Nicolas Probst, Brussels; Hendrik Smet, Willebroek, both of Belgium

[73] Assignee: M.M.M. S.A., Brussels, Belgium

[21] Appl. No.: 525,576

[22] PCT Filed: Mar. 3, 1994

[86] PCT No.: PCT/EP94/00619

§ 371 Date: Sep. 18, 1995

§ 102(e) Date: Sep. 18, 1995

[87] PCT Pub. No.: WO94/21720

PCT Pub. Date: Sep. 29, 1994

[30] Foreign Application Priority Data

Mar. 17, 1993 [DE] Germany ............... 43 08 488.5

[51] Int. Cl.⁶ .................................................. C08K 3/04
[52] U.S. Cl. ............................................ 524/496; 524/495
[58] Field of Search ................................. 524/495, 496

[56] References Cited

U.S. PATENT DOCUMENTS

| | | | |
|---|---|---|---|
| 3,364,156 | 1/1968 | Kraus | 524/495 |
| 4,360,627 | 11/1982 | Okado et al. | 524/496 |
| 4,477,621 | 10/1984 | Sato et al. | 524/495 |
| 4,786,680 | 11/1988 | Suzuki et al. | 524/496 |
| 5,132,357 | 7/1992 | Endter et al. | 524/496 |
| 5,137,962 | 8/1992 | Green | 524/496 |
| 5,162,409 | 11/1992 | Mroczkowski | 524/495 |
| 5,236,992 | 8/1993 | Bush | 524/495 |
| 5,294,253 | 3/1994 | Carlson et al. | 524/496 |
| 5,321,072 | 6/1994 | Misono | 524/495 |
| 5,362,793 | 11/1994 | Garro et al. | 524/496 |
| 5,382,621 | 1/1995 | Laube | 524/496 |
| 5,434,212 | 7/1995 | Yatsunami et al. | 524/496 |

FOREIGN PATENT DOCUMENTS

| | | | |
|---|---|---|---|
| 0004631 | 1/1984 | Japan | 524/495 |
| 0017114 | 11/1991 | WIPO | 524/496 |

*Primary Examiner*—Peter A. Szekely
*Attorney, Agent, or Firm*—Bardehle, Pagenberg, Dost, Altenburg, Frohwitter, Geissler & Partners

[57] ABSTRACT

Carbon black/rubber composition containing 100 parts by weight of a rubber and from 40 to 200 parts by weight of a special carbon black, with the composition having a steeper tan δ temperature profile and flatter G* temperature profile than when regular tire tread black is used.

11 Claims, No Drawings

CARBON BLACK/RUBBER COMPOSITION

This invention relates to a new rubber composition in which carbon black is incorporated. In particular, the invention relates to a carbon black/rubber composition for use in tyre treads.

Carbon black plays a critical role in tyre compositions. The differences in carbon black properties have a strong influence on important features of a rubber composition for tyres, such as abrasion and heat build-up. For this reason, particularly in high performance tyres and tyres for high stress conditions, different carbon black/rubber compositions are used for the tyre tread and for the tyre wall.

U.S. Pat. No. 4,782,927 describes a rubber composition for low rolling resistance and high wet skid resistance.

DE-34 26 864 discloses a rubber composition for tyre treads having a relatively low energy loss.

An object of this invention is to provide a new carbon black/rubber composition.

A further object of this invention is to provide a carbon black/rubber composition which allows control of properties of tyre compositions by mixing such a carbon black/rubber composition into tyre compositions.

Furthermore, a further object of this invention is to provide a new carbon black which, owing to its properties in carbon black/rubber compositions, allows a particularly advantageous "tailoring" of the properties of such carbon black/rubber compositions, namely by mixing the new carbon black/rubber composition into other rubber compositions.

This invention provides a new carbon black/rubber composition as defined in the claims.

In particular, the carbon black in the composition of this invention has the following properties:

a) a surface area (determined by means of nitrogen or by means of CTAB) of from 30 to 100 m$^2$/g, preferably from 40 to 80 m$^2$/g;

b) a DBP value of from 90 to 180 ml/100 g, preferably from 130 to 180 ml/100 g;

c) a 24M4-DBP value of from 70 to 130 ml/100 g, preferably from 85 to 120 ml/100 g;

where, furthermore, when the carbon black is incorporated in a standard carbon black/rubber composition of this invention and the composition is vulcanized in accordance with ASTMD-3191 at 155° C. at $t_{90}$, this standard carbon black/rubber composition has the following features:

| a) tan δ (1 Hz) at | |
|---|---|
| −22° C. > 0.320 | preferably > 0.340 |
| 18° C. 0.140 to 0.200 | preferably 0.150 to 0.180 |
| 58° C. 0.100 to 0.140 | preferably 0.110 to 0.130 |
| 98° C. < 0.090 | preferably < 0.085 |
| $\frac{\tan \delta (-22° C.) - \tan \delta (98° C.)}{\tan \delta (-22° C.)}$ ; | minimum 0.76; |
| b) tan δ (10 Hz) at | |
| −22° C. > 0.550 | preferably > 0.570 |
| 18° C. 0.130 to 0.200 | preferably 0.160 to 0.185 |
| 58° C. 0.110 to 0.160 | preferably 0.130 to 0.150 |
| 98° C. < 0.110 | preferably < 0.100 |
| $\frac{\tan \delta (-22° C.) - \tan \delta (98° C.)}{\tan \delta (-22° C.)}$ ; | minimum 0.83; |
| c) G* (1 Hz) at | |
| −22° C. 8 to 16 | preferably 9 to 12 |
| 18° C. 3.5 to 7.0 | preferably 4 to 5.5 |
| 58° C. 3 to 7.0 | preferably 3 to 4.5 |
| 98° C. 2.5 to 5.0 | preferably 2.8 to 4.0 |
| G* (−22° C.)-G* (98° C.); | maximum 8; |
| d) G* (10 Hz) at | |
| −22° C. 14 to 21 | preferably 15 to 18 |
| 18° C. 4 to 8 | preferably 4.5 to 6 |
| 58° C. 3 to 6 | preferably 3.4 to 4.8 |
| 98° C. 3 to 5.5 | preferably 3 to 4.5 |
| G* (−22° C.)-G* (98° C.); | maximum 14. |

The above properties are determined in accordance with the following methods:

| | |
|---|---|
| nitrogen surface area | ASTM D-3037 |
| CTAB surface area | ASTM D-3765 |
| DBP | ASTM D-2414 |
| 24M4-DBP | ASTM D-3493 |
| tan δ | vulcanized in ASTM D3191 at 155° C. at $t_{90}$ |
| G* | vulcanized in ASTM D3191 at 155° C. at $t_{90}$. |

Tan δ and G* were measured on a Rheometrix RDA 700 using the following parameters:

| | |
|---|---|
| specimen shape: | strips |
| deformation: | torsion |
| deformation amplitude: | 2% |
| temperatures: | −20° C., 20° C., 60° C., 100° C. |
| frequency: | 0.1–100 Rad/s (radians/s) |

The preferred carbon black of this invention possesses large aggregates which preferably have a branched or chain-like structure (cf. accompanying SEM photograph).

The nitrogen surface area and the CTAB surface area are preferably both about the same; no porosity or tar-like residues are present.

The rubber composition according to this invention preferably contains from 40 to 200 parts by weight of the abovementioned carbon black per 100 parts by weight of rubber. The rubber is preferably selected from 1, 2 or 3 of the following elastomers:

natural rubber diolefin-monovinylarene copolymer rubber, in particular butadiene-styrene copolymer rubber polyalkadiene, more preferably polybutadiene and polyisoprene.

If desired and preferably, the composition can also contain small amounts of other rubbers, especially chloro or bromo rubbers, such as polyisoprene or halobutyls, preferably chloropolyisoprenne, bromoisoprene, halopolyisobutylene. Halobutyls are, for example, haloisobutylene rubbers (CIIR - BIIR). The amount of such special rubbers in the compositions of this invention is preferably from 5 to 30 parts by weight based on 100 parts per weight of the main rubber. In addition, the rubber compositions of this invention contain as the further main constituent the carbon black defined above, and they usually contain other typical additives such as plasticizers, antioxidants and accelerators. The compositions normally contain vulcanizers such as sulfur.

Preferably, the composition may contain from 20 to 100 parts by weight of an abrasion-resistant tyre tread black and from 20 to 100 parts by weight of the above-described carbon black, based on 100 parts by weight of the rubber.

The following examples illustrate the invention. Furthermore, they contain particularly preferred features of the invention.

EXAMPLE

A carbon black/rubber composition which is suitable as a tyre tread composition for passenger car tyres was prepared by mixing the following constituents in a mixer for a total amount of about 1.5 kg of rubber composition:

TABLE 1

| (Amounts in parts by weight) | | |
|---|---|---|
| | N339 | Ensaco 150 |
| 1: SBR 1712 EM[1] | 137.5 | 137.5 |
| 2: Carbon black[2] | 80.0 | 80.0 |
| 3: ZnO[3] | 3.0 | 3.0 |
| 4: Stearic acid[4] | 2.5 | 2.5 |
| 5: Ingralen 450[5] | 10.0 | 10.0 |
| 6: Protektor G 32[6] | 1.0 | 1.0 |
| 7: Vulkanox 4010 NA[7] | 1.5 | 1.5 |
| 8: Vulkacit CZ[8] | 1.2 | 1.2 |
| 9: Vulkacit D[9] | 0.4 | 0.4 |
| 10: Schwefel[10] | 1.8 | 1.8 |

[1] A styrene-butadiene copolymer commercially availably from HÜLS.
[2] The carbon black used in the two test runs was N-339 commercially available from Columbian Carbon, and Ensaco 150 commercially available from M.M.M.
[3] Zinc oxide commercially available from Zinkweiss.
[4] Stearic acid produced and sold by Rheinchemie.
[5] Ingralen, an aromatic oil produced and sold by Fuchs.
[6] Protektor G, a microcrystalline wax produced and sold by LW-FULLER GmbH.
[7] Vulkanox 4010 NA, a phenyl-isopropyl-p-phenylene-diamine produced and sold by Bayer.
[8] Vulkacit CZ, a cyclohexylbenzothiazylsulfenamide produced and sold by Bayer.
[9] Vulkacit D, a diphenylguanidine produced and sold by Bayer.
[10] Sulfur produced and sold by Metallgesellschaft.

The properties of the carbon black used are as follows:

TABLE 2

| | Ensaco 150 | N - 339 |
|---|---|---|
| Nitrogen S.A. m²/g | 45 | 90 |
| CTAB S.A. m²/g | 45 | 91 |
| Iodine number mg/g ASTM 01510 | 47 | 90 |
| DBP A ml/100 g | 160 | 120 |
| 24M4 DBP ml/100 g | 92 | 99 |
| Aggregate structure | branched[1] chain-like | cluster[1] |

[1] The aggregate structure was determined by means of SEM.

The properties shown in the above table were determined in accordance with the above-described methods.

The rubber composition prepared was used for making specimens for various tests of this composition. These tests were carried out after vulcanizing or curing the specimens which were produced at a temperature of 155° C. and for a time of $t_{90}$ minutes. The most important mechanical properties are shown in the following table:

TABLE 3

| | N339 | Ensaco 150 |
|---|---|---|
| Shore A[1] | 64 +/− 0.5 | 54 +/− 0.2 |
| Rebound resilience[2] % | 29 +/− 0.2 | 36 +/− 0.2 |
| Tensile strength[3] (MPa) | 22.5 +/− 1.1 | 16.9 +/− 0.7 |
| Modulus (MPa) at[4] | | |
| 100% | 1.2 +/− 0.1 | 1.4 +/− 0.1 |
| 300% | 2.1 +/− 0.1 | 2.9 +/− 0.1 |
| 500% | 10.9 +/− 0.6 | 10.4 +/− 0.2 |
| Elongation %[5] | 559 +/− 28 | 555 +/− 40 |
| Tear strength[6] N/m | 12.7 +/− 0.4 | 14.4 +/− 0.5 |
| Abrasion loss[7] g/mm³ | 87 +/− 4 | 122 +/− 2 |
| Density[8] g/cm³ | 1.152 | 1.158 |

[1] Determined in accordance with DIN 53 505.
[2] Determined in accordance with DIN 53 512.
[3] Determined in accordance with DIN 53 504.
[4] Determined in accordance with DIN 53 504.
[5] Determined in accordance with DIN 53 504.
[6] Determined in accordance with DIN 53 507.
[7] Determined in accordance with DIN 53 516.
[8] Determined in accordance with DIN 53 479.

The tyre performance characteristics G* and tan δ were also measured on the vulcanized specimens using the standard technologies for measuring these abovementioned features. The results are shown in the following table:

TABLE 4

| | Temperature | | | |
|---|---|---|---|---|
| Carbon black | −22° C. | 17° C. | 58° C. | 98° C. |
| | G* (MPa), frequency 1 Hz | | | |
| N339 | 22.49 | 6.437 | 3.974 | 3.193 |
| Ensaco 150 | 14.04 | 4.739 | 3.355 | 2.799 |
| | tan δ, frequency 1 Hz | | | |
| N339 | 0.5010 | 0.3046 | 0.2143 | 0.1445 |
| Ensaco 150 | 0.5159 | 0.2389 | 0.1537 | 0.0891 |
| | G* (MPa), frequency 10 Hz | | | |
| N339 | 35.52 | 7.689 | 4.504 | 3.507 |
| Ensaco 150 | 24.43 | 5.575 | 3.730 | 3.020 |
| | tan δ, frequency 10 Hz | | | |
| N339 | 0.6808 | 0.3359 | 0.2357 | 0.1614 |
| Ensaco 150 | 0.7694 | 0.2632 | 0.1787 | 0.1049 |

As can be seen from the last table, the carbon black/rubber composition according to this invention has a steeper temperature profile for tan δ than does regular tyre tread black N339. In contrast, the temperature profile for the G* value for the novel composition is not as steep as for regular tyre tread black. The tyre tread composition of this invention thus possesses a high hysteresis at low temperatures and a very low hysteresis at high temperatures. This allows the mixing of the defined carbon black into a tyre tread composition, if desired together with other carbon blacks, so that both the group in the wet of the rubber composition is increased and the rolling resistance at high temperature is reduced. This represents an advantageous combination of properties of a carbon black/rubber composition. The respective temperature profile allows the use of this black for "tailoring" tyre compositions, in particular when special carbon blacks having high abrasion resistance are used in combination with the new carbon black claimed.

Other properties are maintained at an acceptable level and can be matched.

We claim:

1. A carbon black/rubber composition comprising 100 parts by weight of a rubber and from 40 to 200 parts by weight of a carbon black, wherein the carbon black comprises:
   a) a surface area (determined by means of nitrogen or by means of CTAB) of from 30 to 100 m$^2$/g;
   b) a DBP value of from 90 to 180 ml/100 g;
   c) a 24M4-DBP value of from 70 to 130 ml/100 g; and
wherein the carbon black composition comprises:
   a) a tan δ (1 Hz) value at
      −22° C.>0.320
      18° C. 0.140 to 0.200
      58° C. 0.100 to 0.140
      98° C.<0.090

$$\frac{\tan \delta\,(-22°\,C.) - \tan \delta\,(98°\,C.)}{\tan \delta\,(-22°\,C.)}\ ;\ \text{minimum } 0.76;$$

b) a tan δ (10 Hz) value at
      −22° C.>0.550
      18° C. 0.130 to 0.200
      58° C. 0.110 to 0.160
      98° C.<0.110

$$\frac{\tan \delta\,(-22°\,C.) - \tan \delta\,(98°\,C.)}{\tan \delta\,(-22°\,C.)}\ ;\ \text{minimum } 0.83;$$

c) a G* (1 Hz) value at
      −22° C. 8 to 16
      18° C. 3.5 to 7.0
      58° C. 3 to 7.0
      98° C. 2.5 to 5.0
      G* (−22° C.)−G* (98° C.); maximum 8;
   d) a G* (10 Hz) value at
      −22° C. 14 to 21
      18° C. 4 to 8
      58° C. 3 to 6
      98° C. 3 to 5.5
      G* (−22° C.)−G* (98° C.); maximum 14;
whereby the above properties are determined in accordance with the following methods:

| | |
|---|---|
| nitrogen surface area | ASTM D-3037 |
| CTAB surface area | ASTM D-3765 |
| DBP | ASTM D-2414 |
| 24M4-DBP | ASTM D-3493 |
| tan δ | vulcanized in ASTM D3191 at 155° C. at $t_{90}$ |
| G* | vulcanized in ASTM D3191 at 155° C. at $t_{90}$. |

2. A composition as claimed in claim 1, wherein the rubber comprises at least one rubber selected from the group consisting of:
   natural rubber
   diolefin-monovinylarene copolymer rubber; and
   polyalkadiene.

3. A composition as claimed in claim 1 or 2, further comprising from 5 to 35 parts by weight of at least one rubber selected from the group consisting of halo rubber, chloro rubber and bromo rubber.

4. A composition as claimed in claim 1 or 2, containing from 20 to 100 parts by weight of an abrasion-resistant tire tread carbon black and from 20 to 100 parts by weight of the carbon black as claimed in claim 1 based on 100 parts by weight of the rubber.

5. A composition as in claim 1, wherein said carbon black comprises:
   a) a surface area of from 40 to 80 m$^2$/g;
   b) a DBP value of from 130 to 180 ml/100 g;
   c) a 24M4-DBP value of from 85 to 120 ml/100 g; and
wherein said carbon black/rubber composition comprises:
   a) a tan δ (1 Hz) value at
      −22° C.>0.340,
      18° C. 0.150 to 0.180,
      58° C. 0.110 to 0.130,
      98° C.<0.085;
   b) a tan δ (10 Hz) value at
      −22° C.>0.570,
      18° C. 0.160 to 0,185,
      58° C. 0.130 to 0.150,
      98° C.<0.100;
   c) a G* (1 Hz) value at
      −22° C. 9 to 12,
      18° C. 4 to 5.5,
      58° C. 3 to 4.5,
      98° C. 2.8 to 4.0;
   d) a G* (10 Hz) value at
      −22° C. 15 to 18,
      18° C. 4.5 to 6,
      58° C. 3.4 to 4.8,
      98° C. 3 to 4.5.

6. A composition as claimed in claim 2, wherein said diolefin-monovinylarene copolymer rubber comprises butadiene-styrene copolymer rubber and wherein said polyalkadiene comprises polybutadiene.

7. A composition as in claim 2, wherein said polyalkadiene comprises polyisoprene.

8. A composition as claimed in claim 3, wherein said halo rubber comprises halopolyisobutylene.

9. A composition as in claim 3, wherein said chloro rubber comprises chloropolyisoprene.

10. A composition as in claim 3, wherein said bromo rubber comprises bromoisoprene.

11. A composition as claimed in claim 3, containing from 20 to 100 parts by weight of an abrasion-resistant tire tread carbon black and from 20 to 100 parts by weight of the carbon black as claimed in claim 1 based on 100 parts by weight of the rubber.

* * * * *

UNITED STATES PATENT AND TRADEMARK OFFICE
CERTIFICATE OF CORRECTION

PATENT NO. : 5,639,817
DATED : June 17, 1997
INVENTOR(S) : Nicolas Probst, Hendrik Smet It is certified that error appears in the above-identified patent and that said Letters Patent is hereby corrected as shown below:

Please change "tyre" to --tire-- in the following locations:

Column 1, line 6
Column 1, line 7
Column 1, line 10
Column 1, line 11 (both occurrences)
Column 1, line 13 (both occurrences)
Column 1, line 16
Column 1, line 22
Column 1, line 23
Column 3, line 2

UNITED STATES PATENT AND TRADEMARK OFFICE
CERTIFICATE OF CORRECTION

PATENT NO. : 5,639,817
DATED : June 17, 1997
INVENTOR(S) : Nicolas Probst, Hendrik Smet It is certified that error appears in the above-identified patent and that said Letters Patent is hereby corrected as shown below:

Column 3, line 13 (both occurrences)
Column 4, line 23
Column 4, line 50
Column 4, line 52
Column 4, line 53
Column 4, line 56
Column 4, line 62

Also, please change "ASTMD" to --ASTM D-- in the following location:

Column 1, line 46

Signed and Sealed this

Sixth Day of January, 1998

Attest:

BRUCE LEHMAN

Attesting Officer

Commissioner of Patents and Trademarks